Patented July 28, 1936

2,048,786

UNITED STATES PATENT OFFICE 2,048,786

TREATMENT OF TEXTILE MATERIAL

George Holland Ellis and Ernest William Kirk, Spondon, near Derby, England, assignors to Celanese Corporation of America, a corporation of Delaware No Drawing. Application April 14, 1933, Serial No. 666,172. In Great Britain May 3, 1932

3 Claims. (Cl. 8—5)

This invention relates to the dyeing, printing, stencilling or otherwise colouring of materials consisting of or containing cellulose acetate or other cellulose esters or ethers and more particularly to the coloration of such materials by the azoic process.

The coloration of textile materials by the formation of azo dyes thereon from suitable components has long been practised and the method has become of especial importance since the introduction as coupling components of the arylamides of 2:3-oxynaphthoic acid. By the use of these arylamides very valuable shades may be produced on cotton materials, the usual practice being to impregnate the material with an alkaline solution of the coupling component and thereafter to develop the colour by means of a diazo compound.

In U. S. Patent No. 1,844,350 is described a process whereby these coupling components may be utilized for the production of valuable fast shades on cellulose ester and ether materials. According to that specification oxynaphthoic acid arylide coupling components are applied to the materials in the free state in the form of dispersions instead of in the form of alkaline solutions, as commonly practised in the case of cellulosic materials. By this process valuable shades of very good fastness to rubbing and to the action of light and other agencies may readily be obtained, whereas the corresponding shades produced with the aid of the usual alkaline solutions of the coupling components are unsatisfactory, particularly in respect of fastness to rubbing.

Again, in producing on cellulose ester or ether materials azoic colorations from β-keto-acidylamino compounds and diazo compounds, the coupling components may, as described in U. S. application S. No. 287,646 filed 22nd June, 1928, likewise be applied in the free state instead of in the form of alkali salts.

According to U. S. application S. No. 636,944 filed 8th October, 1932 this method of applying coupling components in the free state when producing azoic colors on cellulose esters or ethers, may very advantageously be utilized with coupling components of a phenolic character in general such as contain acidylamino groups, and in particular with aryl amides of hydroxy carboxylic acids of the aromatic series.

We have now found that very valuable colorations may be produced on cellulose ester or ether materials by azoic methods in which phenolic or other coupling components are applied to the materials in the free state, by using, as diazo components, diazotizable compounds of the general formula $R_1NH.R_2$. In this formula $R_1$ and $R_2$ represent cyclic radicals of which at least one is an aromatic residue containing a diazotizable amino group. These compounds may contain further substituents, either in the nuclei $R_1$ and $R_2$ or in the NH group, and further, $R_1$ and $R_2$ may be united by a further linkage in addition to the imide group. Such linkages may for instance be direct, as in the case of carbazole, or may be through an atom or group such a sulphur, oxygen, methylene, or the ketonic group.

By this means valuable blue to black colorations may be produced upon cellulose ester or ether materials, especially by coupling diazotized amino diarylamines or amino carbazoles with arylamides of 2:3-oxynaphthoic acid. Shades may thus be produced which are moreover of extremely good fastness properties, particularly as regards fasteness to light and light in the presence of acid, such as the acid fumes produced by the combustion of coal gas. Such fast shades are of especial value in view of the lack of blue dyestuffs for cellulose esters and ethers which exhibit these desirable properties. A particularly valuable shade of navy blue may for instance be obtained by coupling on the material tetrazotized 4:4'-diamino-diphenylamine with the 2':5'-dimethoxy anilide of 2:3-oxynaphthoic acid.

As examples of diazo components suitable for use in accordance with the invention, mention may be made of the mono and diamino derivatives of diphenylamine or phenyl naphthylamine, especially such compounds as contain a diazotizable amino group in para-position to the imide nitrogen. As specific examples may be mentioned para-amino-diphenylamine, the previously mentioned 4:4'-diamino-diphenylamine, 4-amino-4'-ethoxy- or methoxy-diphenylamine, 4-amino-3:4'-dimethoxy-diphenylamine, 4-amino-3-methyl-4'-methoxy-diphenylamine, 4-amino-2'-methyl- or methoxy- or ethoxy-diphenylamine, 4-amino-2'-chloro-diphenylamine. Among the compounds in which the radicals $R_1$ and $R_2$ are united by a further linkage in addition to the imide group, may be mentioned amino derivatives of carbazole, for example 1-, 2-, 3- or 4-amino carbazole, or 2:7-diamino carbazole. Further, derivatives of these amino carbazoles may be employed, for example halogen, alkoxy, or nitro derivatives, or derivatives substituted in the imide group. As examples of such substituted amino carbazoles mention may be made of 2-amino-3:6-dichloro carbazole, 2:7-diamino-3:6-dichloro carbazole, 3-amino-N-ethyl carbazole and 3-amino-5:6-benzo-carbazole.

The coupling components employed may be of any desired character and especially the arylamides of 2:3-hydroxy naphthoic acid or its nuclear substitution products, or of other hydroxy naphthoic acids. Apart from 2:3-oxy naphthoic acid itself mention may be made of its 6-amino-, 6-alkylamino, 6-arylamino or 6-brom-derivatives, and of 1-hydroxy-7-arylamino-3-naphthoic acid, and 1-oxy-4-naphthoic acid.

Again the hydroxy carboxylic acids may be of the carbazole or benzene series and especially those in which the carboxylic and hydroxy groups are in the ortho-position to one another. In the case of the carbazole series there may be used for instance carbazole 2-hydroxy-3-carboxylic acid or other hydroxy carbazole carboxylic acids obtainable by subjecting hydroxy carbazoles to the action of carbon dioxide in the presence of caustic alkali. Again, mention may be made of the hydroxy carboxylic acids derived from hydroxy naphtho carbazoles by reaction with carbon dioxide, for instance the acid obtainable in this way from 5-, 6-, or 7-hydroxy-2:1-naphtho-carbazole or from 5-hydroxy-1:2-naphtho-carbazole. For the purposes of the present invention hydroxy carboxylic acids of the benzene series may be of simple character, as for example salicylic acid or its homologues or substitution products, for example ortho-, meta-, or para-cresotinic acid, or they may be more complex compounds. As examples of such acids of more complex character may be mentioned the hydroxy carboxylic acids of diphenyl, diphenylamine, benzophenone, or diphenylsulphone in which two benzene nuclei are linked together directly or through an additional carbon, nitrogen, sulphur, or other atom or group. There may be used for instance 3-hydroxy-benzophenone-4-carboxylic acid or 3-hydroxy-didiphenylamine-4-carboxylic acid or 3-hydroxy-diphenyl-amine-4-carboxylic acid or homologues or substitution products of these compounds, for instance the halogen substitution products.

The arylamides of these and other acids employed may be derived from any desired aromatic amines, whether of the benzene, naphthalene, carbazole or other series. As examples of suitable amines mention may be made of aniline, ortho- or para-toluidine, xylidines, or the halogen, nitro or alkoxy substitution products of these amines, e. g. chloranisidines or amino-hydroquinone-dialkylethers. Again, α- or β-naphthylamine or substitution products thereof, for instance 1-amino-4-nitro-naphthalene or 1-amino-2-naphthol-methyl-ether, may be used. Further, aromatic diamines may be used, in which case one, or more than one, amino may contain as a substituent, a residue of one of the foregoing hydroxy carboxylic acids.

Though the invention is of special importance when employing coupling components which are amides or substituted amides, particularly arylamides, of hydroxy carboxylic acids of the naphthalene, benzene, carbazole or other series, the invention is not restricted to the utilization of these compounds. Other phenolic coupling components containing an acidylamino group may be employed, especially the N-aracyl or other N-acyl derivatives of aromatic amino hydroxy compounds, for example of amino naphthols, amino phenols, or amino hydroxy compounds of the carbazole series. Specific mention may be made for instance of the benzoyl, urea or other acidyl derivatives of 2:3-amino naphthol or 1:7-amino naphthol. Still other coupling components may however be employed, for example β-naphthol or compounds containing the group CH₂CO, for example pyrazolones or any of the β-keto-acidylamino compounds mentioned in U. S. application S. No. 287,646 filed 22nd June, 1928.

The treatment with nitrous acid of the special diazo components used in accordance with the invention frequently not only effects diazotization but also introduces a nitroso group. This nitroso group may be removed after the completion of the coupling operation, for instance by a hot soaping treatment or by the action of mild reducing agents such as sodium sulphide, sulphites, or hydroquinone.

We have also observed that a soaping treatment after coupling is often advantageous apart from any action in removing nitroso groups. Thus, prolonged soaping frequently effects an improvement in the shades obtained or the fastness thereof. We have further found that instead of, or in addition to, such a soaping treatment, the materials may advantageously be steamed whereby similar improvements may often be more readily effected. Such steaming treatment may be effected under such conditions as to avoid delustring, if the latter is not desired.

In effecting the colouration the materials may be treated first with the dispersion of the coupling component and then with the diazo solution, or the diazo component may first be applied and diazotized on the material and thereafter developed, or if desired both diazo component and coupling component may be applied to the materials and diazotization and coupling effected thereon. In the latter case the amine and coupling component may be applied together or separately as may be desired or convenient. In practice it is found particularly advantageous to apply both diazo and coupling components from a single bath in which they are present in the dispersed state. Where both components are applied to the materials prior to diazotization, the latter may be effected by treating the materials with a suitable acidified nitrite solution. Thereafter, if necessary to complete the coupling, the material may be subjected to an alkaline treatment.

The dispersions of the diazo or coupling components may be obtained by any desired method, for example by fine milling or grinding with or without the aid of dispersators and/or protective colloids, by precipitation in the presence of protective colloids, or by a simple treatment with dispersators, as described for instance in U. S. Patents Nos. 1,618,413, 1,618,414, 1,694,413, 1,690,-481, 1,803,008, 1,340,572 and 1,716,721 and U. S. applications S. Nos. 390,423 filed 4th September, 1929 and 390,424 filed 4th September, 1929. In some cases the dispersion of coupling components may be facilitated by the presence of small quantities of alkali, for example a quantity of caustic soda sufficient to yield a preparation of about pH 7.2 or even slightly more alkaline.

The absorption of either or both components by the cellulose ester and ether materials may be facilitated if desired by incorporating swelling agents in the dyeing or padding liquors or printing pastes employed, or the materials may be pretreated with swelling agents. Alcohol is particularly suitable for this purpose, though other swelling agents may be employed if desired.

The application of the diazo and/or the coupling components may be effected by dyeing or other method of uniform application, or by printing, stencilling or other method of local application. Whether padding, printing or other mechanical impregnation methods are employed, the materials may be steamed in order to fix the dyestuff components on the material prior to diazotization and development, as described in U. S.

application S. No. 645,039 filed 30th November, 1932.

The invention is of particular value in connection with the colouration of cellulose acetate materials. It may however be applied to the treatment of other esters of cellulose, for instance cellulose formate, propionate or butyrate or the materials obtainable by treating cellulose with esterifying agents while retaining its fibrous form, for example the product known as immunized cotton obtainable by treating alkalized cellulose with para-toluene sulphonic chloride. Cellulose ethers, for instance ethyl or benzyl cellulose, may also be coloured by the new process. Further the latter may be applied to mixed materials containing for instance one or more of the foregoing esters or ethers of cellulose in conjunction with other types of artificial or natural fibres. In the case of treating by the new process mixed materials comprising cellulosic fibres, whether natural or artificial, the latter will in general remain uncoloured. The cellulosic fibres may if desired be coloured at any convenient stage by means of other appropriate dyestuffs. Particularly valuable results may be obtained if the cellulosic part of the mixed material is coloured by means of vat dyestuffs, for example in the manner described in U. S. Patent No. 1,716,720 or British Patent No. 341,408, as in this way both cellulose ester or ether and cellulosic fibre may be coloured in shades of exceptional fastness properties.

The invention is illustrated but not limited by the following examples:—

Example 1

To dye a fast navy blue shade on 100 kilos of cellulose acetate yarn.

1¼ kilos of 4:4'-diamino-diphenylamine are dispersed by heating with 3 kilos of Turkey red oil and diluting with 30 litres of boiling soft water. 3 kilos of 2:3-oxynaphthoic-2':5'-dimethoxy-anilide are dissolved by heating with 2 kilos of Turkey red oil and 800 grams of caustic soda in about 60 litres of hot soft water. Both these dispersions are added to the dyebath of 3,000 litres, to which has previously been added a solution of 1½ kilos of glucose. The yarn is entered at 30° C. and worked at this temperature for 15 minutes, then the temperature is slowly raised to 75° C. and the yarn worked at this temperature for an hour. After lifting and rinsing the yarn is worked for half-an-hour cold in a diazotizing bath containing 8 ccs. per litre glacial acetic acid and 4 grams per litre sodium nitrite. The yarn is again lifted and rinsed, and entered cold into a bath containing 1 gram per litre good textile soap and ¼ gram per litre soda ash and warmed slowly to 75° and soaping continued until the initial deep brown colouration has changed to a deep navy blue shade, then again lifted, rinsed and dried or otherwise treated as desired.

Example 2

To dye a bright blue shade on 10 kilos of cellulose acetate knitted fabric.

50 grams of 4-amino-4'-ethoxy diphenylamine are dispersed with Turkey red oil, as is the base in Example 1. 120 grams of 2-oxy-3-naphthoyl-ortho-toluidine are dissolved in hot soft water containing 30 grams of caustic soda and 250 grams of Turkey red oil. These dispersions are then added, together with 60 grams of glucose, to a dyebath of 300 litres containing 1 gram per litre soap at 30° C. The fabric is entered and worked by suitable winch machinery for ¼ hour at 30° C., then for half-an-hour while raising the temperature to 75° C. and further worked for an hour at this temperature. The fabric is then lifted and rinsed, diazotized and soaped to shade as in Example 1 above, lifted and rinsed again, and dried or otherwise treated as requisite.

Example 3

To dye a fast russet-brown shade on 10 kilos of cellulose acetate woven fabric.

100 grams of 4-amino-carbazole are dispersed as in the previous examples, and 200 grams of 2-oxy-carbazole-3-carboxylic anilide are dissolved with 40 grams of caustic soda and some Turkey red oil and both dispersions added to a dyebath of approximately 15:1 volume ratio contained in a suitable jigger dyeing machine. Before entering the fabric a solution of 100 grams of glucose is added to the dyebath. The fabric is entered at 30–40° C. and the temperature gradually raised to 75° C. and kept at this until samples, diazotized and soaped, show that a sufficient degree of exhaustion of the bath has been attained.

The dyebath is then run off, and after thoroughly rinsing the material, a diazotizing solution of the constitution detailed above run in. The fabric is then worked in this for half-an-hour, then again rinsed, and the shade developed by soaping as detailed in the preceeding examples, rinsing and drying or otherwise treating as necessary.

Example 4

To dye 10 kilos of a fabric of cellulose acetate warp and viscose weft a bright fast cherry red on the former and a fast green on the latter.

The viscose is first dyed with 500 grams of caledon jade green BS, according to the method described in British Patent No. 341,408, leaving the cellulose acetate warp unstained. This is then dyed with a dispersion of 50 grams of 4-amino carbazole dispersed as above, and 100 grams of 2-oxy-3-naphthoic acid m-nitranilide dissolved with 20 grams of caustic soda and 40 grams of glucose. The dyeing is then carried out as in Example 3 above, and the fabric rinsed and dried or otherwise treated as desired.

What we claim and desire to secure by Letters Patent is:—

1. Process for the coloration of organic derivatives of cellulose which comprises applying thereto in the free state the 2':5'-dimethoxy-anilide of 2:3-oxy-naphthoic acid and coupling the latter with a diazotized diamino-diarylamine in which the aryl residues are of the benzene series.

2. Process for the coloration of cellulose acetate which comprises applying thereto in the free state the 2':5'-dimethoxy-anilide of 2:3-oxy-naphthoic acid and coupling the latter with diazotized 4:4'-diamino-diphenylamine.

3. Cellulose acetate colored with the azo dyestuff obtainable by coupling the 2':5'-dimethoxy-anilide of 2:3-oxy-naphthoic acid with diazotized 4:4'-diamino-diphenylamine.

GEORGE HOLLAND ELLIS.
ERNEST WILLIAM KIRK.